(12) United States Patent
Clark et al.

(10) Patent No.: US 8,974,552 B2
(45) Date of Patent: Mar. 10, 2015

(54) LIQUID FUEL COMPOSITIONS

(75) Inventors: Richard Hugh Clark, Chester (GB);
 Caroline Nicola Orlebar, Ince (GB);
 Richard John Price, Ince Chester (GB);
 Robert Wilfred Matthews Wardle, Ince (GB)

(73) Assignee: Shell Oil Company, Houston, TX (US)

( * ) Notice: Subject to any disclaimer, the term of this patent is extended or adjusted under 35 U.S.C. 154(b) by 264 days.

(21) Appl. No.: 12/340,050

(22) Filed: Dec. 19, 2008

(65) Prior Publication Data

US 2009/0193711 A1  Aug. 6, 2009

(30) Foreign Application Priority Data

Jan. 2, 2008  (EP) ..................... 08100029

(51) Int. Cl.
 *C10L 1/18* (2006.01)
 *C10L 1/02* (2006.01)

(52) U.S. Cl.
 CPC ..................... *C10L 1/023* (2013.01)
 USPC ......................................... 44/451

(58) Field of Classification Search
 CPC ........................................ C10L 1/023
 USPC .................... 44/301, 331, 415, 451
 See application file for complete search history.

(56) References Cited

U.S. PATENT DOCUMENTS

| | | | | |
|---|---|---|---|---|
| 4,300,912 A | 11/1981 | Townsend | .......... | 44/56 |
| 4,333,739 A | 6/1982 | Neves | .......... | 44/52 |
| 6,120,566 A | 9/2000 | Mifune et al. | .......... | 44/451 |
| 2001/0020345 A1* | 9/2001 | Haji et al. | .......... | 44/391 |
| 2004/0093790 A1 | 5/2004 | Baker et al. | .......... | 44/369 |
| 2005/0086854 A1* | 4/2005 | Millington et al. | .......... | 44/385 |
| 2006/0137243 A1 | 6/2006 | Tsuchida | .......... | 44/451 |

FOREIGN PATENT DOCUMENTS

| | | | | |
|---|---|---|---|---|
| EP | 1251161 | 10/2002 | ............... | C10L 1/02 |
| GB | 565831 | 11/1944 | | |
| GB | 565832 | 11/1944 | | |
| GB | 565832 A | * 11/1944 | | |
| GB | 2394228 | 7/2005 | ............... | C10L 1/18 |
| GB | 2406567 | 9/2005 | ............. | C07C 29/92 |
| GB | 2433265 | 5/2007 | ............... | C10L 1/02 |
| WO | WO9404476 | 3/1994 | ............... | C07C 1/04 |
| WO | WO02083821 | 10/2002 | ............... | C10L 1/02 |
| WO | WO03064354 | 8/2003 | ............... | C07C 1/04 |
| WO | WO2004050803 | 6/2004 | ............... | C10L 1/02 |
| WO | WO 2004/055134 | * 7/2004 | | |
| WO | WO 2004/055134 A2 * | 7/2004 | | |
| WO | WO2004055134 | 7/2004 | | |
| WO | WO2006031319 | 3/2006 | ............... | C12F 5/00 |
| WO | WO2007061903 | 5/2007 | ............. | C10L 1/185 |

* cited by examiner

*Primary Examiner* — James Goloboy
*Assistant Examiner* — Latosha Hines

(57) ABSTRACT

A liquid fuel composition suitable for use in an internal combustion engine is provided containing (a) from 50 to 90 % v/v of a $C_1$-$C_4$ alcohol;

(b) from 10 to 50 % v/v of a Fischer-Tropsch derived naphtha; and optionally (c) up to 10 % v/v of a $C_3$-$C_6$ hydrocarbon component. A process for preparing a liquid fuel composition and a method of operating an internal combustion engine is also disclosed.

12 Claims, No Drawings

LIQUID FUEL COMPOSITIONS

This application claims the benefit of European Application No. 08100029.1 filed Jan. 2, 2008.

FIELD OF THE INVENTION

The present invention provides a liquid fuel composition suitable for use in a spark-ignition (SI) internal combustion engine.

BACKGROUND OF THE INVENTION

GB 2433265 A (DEREK LOWE) discloses a low toxicity fuel for four-stroke engines, wherein the fuel includes 80-99% ethanol and 1-20% volatile hydrocarbon fractions that are soluble in ethanol. The volatile hydrocarbon fractions are described as being advantageously selected from the group comprising pentane, iso-pentane, butane, iso-butane, propane and combinations thereof.

WO 2004/050803 A1 (GREG BINIONS) discloses a liquid fuel composition comprising 10-80 vol % of a first component comprising at least two aliphatic organic non-hydrocarbon compounds; 20-65 vol % of a second component comprising at least one hydrocarbon and having an aromatic content of less than 15 vol % of the total second component; 1-35 vol % of a third component which comprises an oxygenate; 0.01 to 20 vol % water, wherein at least one compound in the fuel composition is miscible with both water and hydrocarbons to provide a single phase composition. Preferred compounds for use in the first component are disclosed as including ethyl alcohol, propyl alcohol, butyl alcohol, octyl alcohol, butanone, methyl isobutyl ketone, ethyl acetate, isopropyl alcohol and isobutyl alcohol. Light naphthas and some types of gasoline as disclosed as being suitable for the second component, and it is also disclosed straight chain saturated or unsaturated hydrocarbons whose number of carbon atoms is 9 or less may be used in place of all or a part of a low aromatic naphtha for the second component. Ethers which generally have at least two hydrocarbon groups which each have seven, preferably six, or less carbon atoms in the hydrocarbon chain are disclosed as being suitable compounds for the third component, with methylcyclopentadienyl manganese tricarbonyl (MMT), methyl tertiary butyl ether (MTBE), tertiary amyl methyl ether (TAME), ethyl tertiary-butyl ether (ETBE) and dibutyl ether are described as being preferred ethers.

WO 2004/055134 A2 (ALAN EASTMAN ET AL.) discloses a combustible fuel comprising:
(A) an alcohol component in the range of about 55% to about 70% by weight;
(B) a naphtha component in the range of about 30% to about 45% by weight.

WO 2004/055134 A2 states "The term naphtha (or gasoline) as used herein can refer to hydrocarbon compositions. These hydrocarbon compositions include mixtures of hydrocarbons with an atmospheric-pressure boiling range of approximately 40-205° C. (100-400° F.), and can be comprised of alkanes, olefins, naphthalenes, aromatics, etc."

WO 2006/031319 A2 (CONOCOPHILIPS) discloses the use of Fischer-Tropsch naphtha as a denaturant, in particular as a denaturant for ethanol. The denatured ethanol of WO 2006/031319 A2 can then be blended with gasoline to provide a fuel composition. In the examples of WO 2006/031319 A2, example 2 combines about 5.0 gallon of 200 proof ethanol with about 0.1 gallons of Fischer-Tropsch naphtha to form a denatured alcohol. The denatured alcohol of example 2 is then blended with about 51.0 gallons of gasoline; the resulting gasoline is suitable for use in automobiles.

Nowhere in GB 2433265 A, WO 2004/050803 A1 or WO 2004/055134 A2 is the use of Fischer-Tropsch derived naphtha in fuel compositions disclosed.

The distillation properties of Fischer-Tropsch derived naphtha components are comparable to those of gasoline. Despite this, Fischer-Tropsch derived naphtha components have not been generally considered suitable for use directly in gasoline fuel compositions because their octane numbers are too low.

SUMMARY OF THE INVENTION

The present invention provides a liquid fuel composition suitable for use in an internal combustion engine comprising:
(a) from 50 to 90% v/v of a $C_1$-$C_4$ alcohol;
(b) from 10 to 50% v/v of a Fischer-Tropsch derived naphtha; and optionally
(c) up to 10% v/v of a $C_3$-$C_6$ hydrocarbon component.

The present invention also provides a process for preparing a liquid fuel composition, comprising admixing from 50 to 90% v/v of a $C_1$-$C_4$ alcohol with from 10 to 50% v/v of a Fischer-Tropsch derived naphtha, and optionally up to 10% v/v of a $C_3$-$C_6$ hydrocarbon component.

The present invention further provides a method of operating an internal combustion engine, which method involves introducing into a combustion chamber of said engine a liquid fuel composition according to the present invention or prepared by the process of the present invention.

DETAILED DESCRIPTION OF THE INVENTION

It has been found that certain liquid fuel compositions comprising Fischer-Tropsch derived naphtha and alcohol have surprisingly high octane numbers and are suitable for use in an internal combustion engine, in particular in a spark-ignition internal combustion engine.

The liquid fuel composition comprises:
(a) a $C_1$-$C_4$ alcohol;
(b) a Fischer-Tropsch derived naphtha; and optionally
(c) a $C_3$-$C_6$ hydrocarbon.

The $C_1$-$C_4$ alcohol may be any monohydric alcohol containing from 1 to 4 carbon atoms or mixture thereof; preferably the $C_1$-$C_4$ alcohol may be any fully saturated, monohydric alcohol containing from 1 to 4 carbon atoms or mixture thereof. The $C_1$-$C_4$ alcohol may be a primary, secondary or tertiary alcohol, or mixture thereof; preferably the $C_1$-$C_4$ alcohol is a primary or secondary alcohol, or mixture thereof; more preferably the $C_1$-$C_4$ alcohol is a primary alcohol or mixture of primary alcohols; even more preferably the $C_1$-$C_4$ alcohol is a linear primary alcohol or mixture of linear primary alcohols.

The $C_1$-$C_4$ alcohol can be derived from any known natural or synthetic source. Conveniently, the $C_1$-$C_4$ alcohol may be derived from a natural source, for example, by fermentation of biomass.

Conveniently, at least 50% v/v of the $C_1$-$C_4$ alcohol is ethanol, preferably at least 80% v/v of the $C_1$-$C_4$ alcohol is ethanol, more preferably at least 90% v/v of the $C_1$-$C_4$ alcohol is ethanol, even more preferably at least 95% v/v, at least 98% v/v or even at least 99% v/v of the $C_1$-$C_4$ alcohol is ethanol, and most preferably the $C_1$-$C_4$ alcohol is ethanol.

The concentration of the $C_1$-$C_4$ alcohol in the liquid fuel composition is in the range of from 50 to 90% v/v. Preferably, the concentration of the $C_1$-$C_4$ alcohol in the liquid fuel composition accords with a combination of one of parameters (i) to (v) and one of parameters (vi) to (ix) below:—
(i) at least 60% v/v,
(ii) at least 65% v/v,
(iii) at least 68% v/v,
(iv) at least 69% v/v,
(v) at least 70% v/v,
with features (i), (ii), (iii), (iv) and (v) being progressively more preferred; and
(vi) up to 90% v/v,
(vii) up to 89% v/v,
(viii) up to 88% v/v,
(ix) up to 87% v/v,
(x) up to 85% v/v,
with features (vi), (vii), (viii), (ix) and (x) being progressively more preferred.

Examples of specific combinations of the above features are (i) and (vi), (i) and (vii), (i) and (viii), (i) and (ix), (i) and (x), (ii) and (vi), (ii) and (vii), (ii) and (viii), (ii) and (ix), (ii) and (x), (iii) and (vi), (iii) and (vii), (iii) and (viii), (iii) and (ix), (iii) and (x), (iv) and (vi), (iv) and (vii), (iv) and (viii), (iv) and (ix), (iv) and (x), (v) and (vi), (v) and (vii), (v) and (viii), (v) and (ix), and (v) and (x).

If the $C_1$-$C_4$ alcohol comprises a denaturant, the concentration of $C_1$-$C_4$ alcohol in the liquid fuel composition of the present invention is based on the concentration of the $C_1$-$C_4$ alcohol excluding the denaturant. If the $C_1$-$C_4$ alcohol comprises minor amounts water, the concentration of $C_1$-$C_4$ alcohol in the liquid fuel composition of the present invention is based on the concentration of the $C_1$-$C_4$ alcohol excluding the water.

In addition to the $C_1$-$C_4$ alcohol, the liquid fuel composition of the present invention contains a naphtha derived from the product of a Fischer-Tropsch synthesis process (a "Fischer-Tropsch derived naphtha").

By "Fischer-Tropsch derived" is meant that the naphtha is, or is derived from, a product of a Fischer-Tropsch synthesis process (or Fischer-Tropsch condensation process). A Fischer-Tropsch derived naphtha may also be referred to as a GTL (Gas-to-Liquid) naphtha.

The Fischer-Tropsch reaction converts carbon monoxide and hydrogen (synthesis gas) into longer chain, usually paraffinic, hydrocarbons:

$n(CO+2H_2)=(-CH_2-)_n+nH_2O+heat$, in the presence of an appropriate catalyst and typically at elevated temperatures (e.g. 125 to 300° C., preferably 175 to 250° C.) and/or pressures (e.g. 5 to 100 bar, preferably 12 to 50 bar). Hydrogen:carbon monoxide ratios other than 2:1 may be employed if desired.

The carbon monoxide and hydrogen may themselves be derived from organic or inorganic, natural or synthetic sources, typically either from natural gas or from organically derived methane. The gases which are converted into synthesis gas, which are then converted into liquid fuel components using Fischer-Tropsch synthesis can in general include natural gas (methane), LPG (e.g. propane or butane), "condensates" such as ethane, and gaseous products derived from coal, biomass and other hydrocarbons.

The Fischer-Tropsch derived naphtha may be obtained directly from the Fischer-Tropsch reaction, or derived indirectly from the Fischer-Tropsch reaction, for instance by fractionation of Fischer-Tropsch synthesis products and/or by hydrotreatment of Fischer-Tropsch synthesis products. Hydrotreatment can involve hydrocracking to adjust the boiling range (see, e.g., GB-B-2077289 and EP-A-0147873) and/or hydroisomerisation which can improve cold flow properties by increasing the proportion of branched paraffins. EP-A-0583836 describes a two step hydrotreatment process in which a Fischer-Tropsch synthesis product is firstly subjected to hydroconversion under conditions such that it undergoes substantially no isomerisation or hydrocracking (this hydrogenates the olefinic and oxygen-containing components), and then at least part of the resultant product is hydroconverted under conditions such that hydrocracking and isomerisation occur to yield a substantially paraffinic hydrocarbon fuel. The desired fraction(s) may subsequently be isolated for instance by distillation.

Other post-synthesis treatments, such as polymerisation, alkylation, distillation, cracking-decarboxylation, isomerisation and hydroreforming, may be employed to modify the properties of Fischer-Tropsch condensation products, as described for instance in U.S. Pat. Nos. 4,125,566 and 4,478,955.

Typical catalysts for the Fischer-Tropsch synthesis of paraffinic hydrocarbons comprise, as the catalytically active component, a metal from Group VIII of the periodic table, in particular ruthenium, iron, cobalt or nickel. Suitable such catalysts are described for instance in EP-A-0583836 (pages 3 and 4).

An example of a Fischer-Tropsch based process is the SMDS (Shell Middle Distillate Synthesis) described by van der Burgt et al in "The Shell Middle Distillate Synthesis Process", paper delivered at the 5th Synfuels Worldwide Symposium, Washington DC, November 1985 (see also the November 1989 publication of the same title from Shell International Petroleum Company Ltd, London, UK). This process (also sometimes referred to as the Shell "Gas-To-Liquids" or "GTL" technology) produces middle distillate range products by conversion of a natural gas (primarily methane) derived synthesis gas into a heavy long chain hydrocarbon (paraffin) wax which can then be hydroconverted and fractionated to produce the desired product, for example Fischer-Tropsch derived naphtha or liquid transport fuels such as the gas oils useable in diesel fuel compositions. A version of the SMDS process, utilising a fixed bed reactor for the catalytic conversion step, is currently in use in Bintulu, Malaysia and its gas oil products have been blended with petroleum derived gas oils in commercially available automotive fuels.

Examples of other Fischer-Tropsch synthesis processes include the so-called commercial Slurry Phase Distillate technology of Sasol and the "AGC-21" ExxonMobil process. These and other processes are, for example, described in more detail in EP-A-776 959, EP-A-668 342, U.S. Pat. Nos. 4,943,672, 5,059,299, WO-A-99/34917 and WO-A-99/20720.

Fischer-Tropsch derived naphtha prepared by the SMDS process is commercially available for instance from Shell companies. Further examples of Fischer-Tropsch derived products are described in EP-A-0583836, EP-A-1101813, WO-A-97/14768, WO-A-97/14769, WO-A-00/20534, WO-A-00/20535, WO-A-00/11116, WO-A-00/11117, WO-A-01/83406, WO-A-01/83641, WO-A-01/83647, WO-A-01/83648 and U.S. Pat. No. 6,204,426.

By virtue of the Fischer-Tropsch process, a Fischer-Tropsch derived naphtha has essentially no, or undetectable levels of, sulphur and nitrogen. Compounds containing these heteroatoms tend to act as poisons for Fischer-Tropsch catalysts and are therefore removed from the synthesis gas feed.

Further, the Fischer-Tropsch process as usually operated produces no or virtually no aromatic components. The aromatics content of a Fischer-Tropsch derived naphtha, suitably determined by ASTM D4629, will typically be below 1% w/w, preferably below 0.5% w/w and more preferably below 0.2 or 0.1% w/w.

Generally speaking, Fischer-Tropsch derived naphthas have relatively low levels of polar components, in particular polar surfactants, for instance compared to petroleum derived naphthas. Such polar components may include for example oxygenates, and sulphur- and nitrogen-containing compounds. A low level of sulphur in a Fischer-Tropsch derived naphtha is generally indicative of low levels of both oxygenates and nitrogen containing compounds, since all are removed by the same treatment processes.

The Fischer-Tropsch derived naphtha component of the present invention is a liquid hydrocarbon distillate with a final boiling point of typically up to 220° C., preferably up to 180° C. or 175° C. Its initial boiling point is typically at least 25° C., preferably at least 30° C.

The Fischer-Tropsch derived naphtha, or the majority of the Fischer-Tropsch derived naphtha (for example, at least 95% w/w), is typically comprised of hydrocarbons having 5 or more carbon atoms.

Suitably, the Fischer-Tropsch derived naphtha component of the present invention will consist of at least 70% w/w, preferably at least 80% w/w, more preferably at least 90 or 95 or 98% w/w, most preferably at least 99 or 99.5 or even 99.8% w/w, of paraffinic components. By the term "paraffinic", it is meant a branched or non-branched alkane (herein also referred to as iso-paraffins and normal paraffins) or a cylcoalkane. Preferably the paraffinic components are iso- and normal paraffins.

The amount of normal paraffins in the Fischer-Tropsch derived naphtha is up to 100% w/w. Preferably, the Fischer-Tropsch derived naphtha contains from 20 to 98% w/w or greater of normal paraffins.

The weight ratio of iso-paraffins to normal paraffins may suitably be greater than 0.1 and may be up to 12; suitably it is from 2 to 6. The actual value for this ratio may be determined, in part, by the hydroconversion process used to prepare the gas oil from the Fischer-Tropsch synthesis product.

The olefin content of the Fischer-Tropsch derived naphtha component of the present invention is preferably 2.0% w/w or lower, more preferably 1.0% w/w or lower, and even more preferably 0.5% w/w or lower. The aromatic content of the Fischer-Tropsch derived naphtha component of the present invention is preferably 2.0% w/w or lower, more preferably 1.0% w/w or lower, and even more preferably 0.5% w/w or lower.

The Fischer-Tropsch derived naphtha component of the present invention preferably has a density of from 0.67 to 0.73 g/cm$^3$ at 15° C. and a sulphur content of 5 mg/kg or less, preferably 2 mg/kg or less.

It will be appreciated by the skilled person that Fischer-Tropsch derived naphtha will have a very low anti-knock index. Typically, the Research Octane Number (RON), as measured by ASTM D2699, and the Motor Octane Number (MON), as measured by ASTM D2700, of the Fischer-Tropsch derived naphtha component of the present invention will, independently, be at most 60, more typically at most 50, and commonly at most 40.

Preferably, the Fischer-Tropsch derived naphtha component of the present invention is a product prepared by a Fischer-Tropsch methane condensation reaction using a hydrogen/carbon monoxide ratio of less than 2.5, preferably less than 1.75, more preferably from 0.4 to 1.5, and ideally using a cobalt containing catalyst. Suitably, it will have been obtained from a hydrocracked Fischer-Tropsch synthesis product (for instance as described in GB-B-2077289 and/or EP-A-0147873), or more preferably a product from a two-stage hydroconversion process such as that described in EP-A-0583836 (see above). In the latter case, preferred features of the hydroconversion process may be as disclosed at pages 4 to 6, and in the examples, of EP-A-0583836.

Suitably, the Fischer-Tropsch derived naphtha component of the present invention is a product prepared by a low temperature Fischer-Tropsch process, by which is meant a process operated at a temperature of 250° C. or lower, such as from 125 to 250° C. or from 175 to 250° C., as opposed to a high temperature Fischer-Tropsch process which might typically be operated at a temperature of from 300 to 350° C.

In the liquid fuel composition according to the present invention, the Fischer-Tropsch derived naphtha component of the present invention may include a mixture of two or more Fischer-Tropsch derived naphthas.

The concentration of the Fischer-Tropsch derived naphtha in the liquid fuel composition of the present invention is in the range of from 10 to 50% v/v. Preferably, the concentration of the Fischer-Tropsch derived naphtha in the liquid fuel composition of the present invention accords with a combination of one of parameters (xi) to (xv) and one of parameters (xvi) to (xix) below:—
  (xi) at least 11% v/v,
  (xii) at least 12% v/v,
  (xiii) at least 13% v/v,
  (xiv) at least 14% v/v,
  (xv) at least 15% v/v,
  with features (xi), (xii), (xiii), (xiv) and (xv) being progressively more preferred; and
  (xvi) up to 50% v/v,
  (xvii) up to 40% v/v,
  (xviii) up to 35% v/v,
  (xix) up to 32% v/v,
  (xx) up to 30% v/v,
  with features (xvi), (xvii), (xviii), (xix) and (xx) being progressively more preferred.

Examples of specific combinations of the above features are (xi) and (xvi), (xi) and (xvii), (xi) and (xviii), (xi) and (xix), (xi) and (xx), (xii) and (xvi), (xii) and (xvii), (xii) and (xviii), (xii) and (xix), (xii) and (xx), (xiii) and (xvi), (xiii) and (xvii), (xiii) and (xviii), (xiii) and (xix), (xiii) and (xx), (xiv) and (xvi), (xiv) and (xvii), (xiv) and (xviii), (xiv) and (xix), (xiv) and (xx), (xv) and (xvi), (xv) and (xvii), (xv) and (xviii), (xv) and (xix), and (xv) and (xx).

The liquid fuel composition of the present invention optionally comprises up to 10% v/v of a $C_3$-$C_6$ hydrocarbon component. The $C_3$-$C_6$ hydrocarbon component may be any hydrocarbon having 3, 4, 5 or 6 carbon atoms or mixtures thereof; preferably, the $C_3$-$C_6$ hydrocarbon component is a paraffinic hydrocarbon having 3, 4, 5 or 6 carbon atoms or mixtures thereof; more preferably the $C_3$-$C_6$ hydrocarbon component is a paraffinic, aliphatic hydrocarbon having 3, 4, 5 or 6 carbon atoms or mixtures thereof. Conveniently, the $C_3$-$C_6$ hydrocarbon component may be a composition wherein at least 95 wt %, preferably at least 98 wt %, more preferably at least 99 wt %, of the hydrocarbons having the same number of carbon atoms.

The $C_3$-$C_6$ hydrocarbon component can be derived from any known source. Conveniently, the $C_3$-$C_6$ hydrocarbon component may be derived in known manner from straight-run gasoline, synthetically-produced hydrocarbon mixtures, thermally or catalytically cracked hydrocarbons, hydrocracked petroleum fractions, catalytically reformed hydrocarbons, Fischer-Tropsch synthesis or mixtures of these.

Although not essential to the present invention, because of the high volatility of $C_3$-$C_6$ hydrocarbons, the $C_3$-$C_6$ hydrocarbon component can conveniently be included in the liquid fuel composition of the present invention to increase the volatility of the liquid fuel composition which can conveniently be used to improve the cold start performance of the liquid fuel composition. Thus, the concentration of the $C_3$-$C_6$ hydrocarbon component included in the liquid fuel composition of the present invention will vary depending upon the desired volatility of the liquid fuel composition. It will be appreciated that the amount of the $C_3$-$C_6$ hydrocarbon component in the liquid fuel composition of the present invention can conveniently be 0% v/v. However, if a $C_3$-$C_6$ hydrocarbon component is included in the liquid fuel composition of the present invention, they are typically included in a concentration of up to 8% v/v, more typically up to 7% v/v, and, independently, typically in an amount of at least 0.1% v/v, more typically at least 0.25% v/v and most typically in an amount of at least 0.5% v/v. For example, if a $C_3$-$C_6$ hydrocarbon component is included in the liquid fuel composition of the present invention, it is typically included at a concentration in the range of from 0.1 to 10% v/v, more typically from 0.25 to 8% v/v and most conveniently from 0.5 to 7% v/v.

The liquid fuel composition of the present invention is suitable for use in an internal combustion engine, in particular, a spark-ignition internal combustion engine. Suitably, the liquid fuel composition of the present invention can be used to fuel the internal combustion engine of a flexible fuel vehicle (FFV).

It will be appreciated that the liquid fuel composition of the present invention can also be referred to as a gasoline, for example, the liquid fuel composition of the present invention can conveniently be used as an E85 or E70 gasoline.

The liquid fuel composition of the present invention typically has a boiling range in the range of from 25 to 210° C., the optimal ranges and distillation curves typically varying according to climate and season of the year.

The Reid vapour pressure (RVP) of the liquid fuel of the present invention is in the range of from 10 to 100 kPa, preferably from 20 to 90 kPa, more preferably from 30 to 80 kPa (IP 394). The optimal Reid vapour pressure will vary according to climate and season of the year. Conveniently, by varying the amount of the $C_3$-$C_6$ hydrocarbon component the RVP, and consequently the cold start performance, of the liquid fuel composition of the present invention can be controlled.

Surprisingly, even though the values for the research octane number (RON) and the motor octane number (MON) of the Fischer-Tropsch derived naphtha are very low, the RON and the MON of the liquid fuel composition of the present invention are surprisingly high. Preferably, the RON of the liquid fuel composition of the present invention is in the range of from 80 to 120, more preferably from 85 to 115, even more preferably from 90 to 112, most preferably from 95 to 110 (ASTM D2699). The MON of the liquid fuel composition of the present invention is preferably in the range of from 65 to 110, more preferably from 75 to 105, even more preferably from 80 to 100, most preferably from 85 to 95 (ASTM D2700).

Typically, the olefinic hydrocarbon content of the liquid fuel composition of the present invention is in at most 2% v/v. Preferably, the olefinic hydrocarbon content of the liquid fuel composition of the present invention at most 1% v/v.

Typically, the aromatic hydrocarbon content of liquid fuel composition of the present invention is at most 1% v/v. Preferably, the aromatic hydrocarbon content of the liquid fuel composition of the present invention at most 0.5% v/v, more preferably at most 0.25% v/v. Conveniently, the aromatic hydrocarbon content of liquid fuel composition of the present invention is in the range of from 0 to 0.15% v/v.

The benzene content of liquid fuel composition is preferably at most 0.25% v/v, more preferably at most 0.1% v/v percent by volume, especially at most 0.05% v/v.

The liquid fuel composition of the present invention typically has a low or ultra low sulphur content, for instance not more than 500 mg/kg, preferably not more than 150 mg/kg, more preferably not more than 50 mg/kg, even more preferably not more than 10 mg/kg, and most preferably 5 mg/kg of sulphur. Conveniently, the liquid fuel composition of the present invention may be essentially free of sulphur.

The liquid fuel composition of the present invention also preferably has a low total lead content, such as at most 0.005 g/l, most preferably being lead free—having no lead compounds added thereto (i.e. unleaded).

It will be appreciated that the liquid fuel composition of the present invention may be derived entirely from renewable sources.

Whilst not critical to the present invention, the liquid composition of the present invention may conveniently additionally include one or more fuel additive. The concentration and nature of the fuel additive(s) that may be included in the liquid fuel composition of the present invention is not critical. Non-limiting examples of suitable types of fuel additives that can be included in the liquid fuel composition of the present invention include anti-oxidants, corrosion inhibitors, detergents, dehazers, antiknock additives, metal deactivators, valve-seat recession protectant compounds, dyes, friction modifiers, carrier fluids, diluents and markers. Examples of suitable such additives are described generally in U.S. Pat. No. 5,855,629. Conveniently, the liquid fuel composition of the present invention will additionally include one or more fuel additive, especially wherein the one or more fuel additive includes a corrosion inhibitor.

Conveniently, the fuel additives can be blended with one or more diluents or carrier fluids, to form an additive concentrate, the additive concentrate can then be admixed with the liquid fuel composition of the present invention.

The (active matter) concentration of any additives present in the liquid fuel composition of the present invention is preferably up to 1 wt %, more preferably in the range from 5 to 1000 ppmw (parts per million by weight), advantageously in the range of from 75 to 300 ppmw, based on the overall liquid fuel composition.

In addition to the components and additives or additive packages described above, the liquid fuel composition of the present invention may also optionally comprise other components to make up the balance of the liquid fuel composition. For example, the balance of the fuel may comprise hydrocarbon components other than the Fischer-Tropsch derived naphtha and the $C_3$-$C_6$ hydrocarbon component and oxygenates other than a $C_1$-$C_4$ alcohol. If the liquid fuel composition of the present invention comprises hydrocarbon components other than the Fischer-Tropsch derived naphtha and the $C_3$-$C_6$ hydrocarbon component and/or oxygenates other than a $C_1$-$C_4$ alcohols, then these components will preferably be present in a concentration of not more than 10% v/v, more preferably not more than 7% v/v, even more preferably not more than 5% v/v, and most preferably not more than 3% v/v. Conveniently, the liquid fuel composition of the present invention does not comprise additional components other than the Fischer-Tropsch derived naphtha, the optional $C_3$-$C_6$ hydrocarbon component, $C_1$-$C_4$ alcohols and fuel additives or fuel additive concentrates.

A liquid fuel composition according to the present invention may be prepared by a process comprising admixing from 50 to 90% v/v of a $C_1$-$C_4$ alcohol with from 10 to 50% v/v of a Fischer-Tropsch derived naphtha, and optionally up to 10% v/v of a $C_3$-$C_6$ hydrocarbon component. The order and method by which the components of the liquid fuel composition of the present invention are admixed is not critical and any suitable method known in the art may be used to form a liquid fuel composition according to the present invention.

If one or more additional component, for example one or more fuel additive or additive concentrate, are to be included in the liquid fuel composition of the present invention, then the additional component may be admixed with one or more of the components of the liquid fuel composition before, during or after preparation of the liquid fuel composition according to the present invention.

A liquid fuel composition according to the present invention may be used to fuel an internal combustion engine, in particular a spark-ignition internal combustion engine. Thus, the present invention also encompasses the use of a liquid fuel composition comprising:

(a) from 50 to 90% v/v of a $C_1$-$C_4$ alcohol;
(b) from 10 to 50% v/v of a Fischer-Tropsch derived naphtha; and optionally
(c) up to 10% v/v of a $C_3$-$C_6$ hydrocarbon component, as a fuel for an internal combustion engine, in particular a spark-ignition internal combustion.

It will be appreciated that the liquid fuel composition of the present invention is particularly suitable as a fuel for use in flexible fuel vehicles.

The present invention also provides a method of operating an internal combustion engine, which method involves introducing into a combustion chamber of said engine a liquid fuel composition according to the present invention.

The present invention will be further understood from the following examples. Unless otherwise indicated, parts and percentages (concentration) are by volume and pressure is measured in kPa.

EXAMPLES

The liquid fuel compositions of the examples were prepared by combining appropriate volumetric amounts of the components listed in Table 1, at room temperature in sealable metal containers.

If butane was added to the liquid fuel composition, the butane was added from a storage tank to the sealable container, the volume of butane added being measured by a mechanical flow meter.

The containers containing the components of the liquid fuel composition were then sealed and agitated to ensure thorough mixing.

After mixing, the sealed vessels were stored at a temperature below 5° C. to prevent evaporation before testing.

TABLE 1

Fuel compositions

Concentration (% v/v)

| Fuel | Ethanol | GTL Naphtha Fuel | Butane | Gasoline A | Gasoline B |
|---|---|---|---|---|---|
| 1 | 65 | 35 | 0 | 0 | 0 |
| 2 | 75 | 25 | 0 | 0 | 0 |
| 3 | 85 | 15 | 0 | 0 | 0 |
| 4 | 85 | 11 | 4 | 0 | 0 |
| 5 | 70 | 23 | 7 | 0 | 0 |
| 6 | 85 | 10 | 5 | 0 | 0 |
| A* | 0 | 100 | 0 | 0 | 0 |
| B* | 100 | 0 | 0 | 0 | 0 |
| C* | 0 | 0 | 0 | 100 | 0 |
| D* | 70 | 0 | 0 | 30 | 0 |
| E* | 85 | 0 | 0 | 15 | 0 |
| F* | 0 | 0 | 0 | 0 | 100 |
| G* | 70 | 0 | 0 | 0 | 30 |
| H* | 85 | 0 | 0 | 0 | 15 |

*Not according to the present invention.

The ethanol was Bio-Ethanol supplied by Abengoa Bioenergy (density at 15° C. 794.1 kg/l (IP 365)).

The butane used in fuels 4, 5 and 6 was supplied by Shell Gas UK.

The GTL naphtha was a Fischer-Tropsch derived naphtha having the parameters defined in Table 2 below.

TABLE 2

GTL naphtha

| Parameter | Unit | Value |
|---|---|---|
| Density at 15° C. (IP 365) | g/l | 678.6 |
| Distillation % recovered, GC | | |
| IBP | ° C. | 33.7 |
| 10% | ° C. | 61.4 |
| 20% | ° C. | 71.3 |
| 30% | ° C. | 79.7 |
| 40% | ° C. | 87.2 |
| 50% | ° C. | 94.8 |
| 60% | ° C. | 102 |
| 70% | ° C. | 109.4 |
| 80% | ° C. | 116.8 |
| 90% | ° C. | 124.6 |
| 95% | ° C. | 129.6 |
| FBP | ° C. | 138.5 |
| Paraffins | % v/v | 99.25 |
| Aromatics | % v/v | 0.01 |
| Oygenates | % v/v | 0 |
| Sulphur Content (ASTM D2622-94) | mg/kg | <5 |

Gasoline A was an unleaded gasoline base fuel having the parameters defined in Table 3 below.

TABLE 3

Gasoline A

| Parameter | Unit | Value |
|---|---|---|
| RON (ASTM D2699) | | 96.2 |
| MON (ASTM D2700) | | 85.0 |
| Density at 15° C. | g/l | 741.4 |
| Distillation % recovered, GC (ISO 3405/88) | | |
| IBP | ° C. | 30.7 |
| 10% | ° C. | 40.9 |
| 20% | ° C. | 54.9 |
| 30% | ° C. | 69.2 |
| 40% | ° C. | 84.9 |
| 50% | ° C. | 101.5 |
| 60% | ° C. | 115 |
| 70% | ° C. | 126.7 |
| 80% | ° C. | 141.5 |
| 90% | ° C. | 160.4 |
| 95% | ° C. | 175.7 |
| FBP | ° C. | 204.7 |

TABLE 3-continued

| Gasoline A | | |
|---|---|---|
| Parameter | Unit | Value |
| Paraffins | % v/v | 45.55* |
| Aromatics | % v/v | 35.02 |
| Oxygenates | % v/v | 0 |
| Sulphur (ASTM D2622-94) | mg/kg | 34 |

*Total volume of iso- and normal paraffins

Gasoline B was an unleaded gasoline base fuel having the parameters defined in Table 4 below.

TABLE 4

| Gasoline B | | |
|---|---|---|
| Parameter | Unit | Value |
| RON (ASTM D2699) | | 99.0 |
| MON (ASTM D2700) | | 87.7 |
| Density at 15° C. | g/l | 775.2 |
| Distillation % recovered, GC (ISO 3405/88) | | |
| IBP | ° C. | 33.6 |
| 10% | ° C. | 58.0 |
| 20% | ° C. | 77.6 |
| 30% | ° C. | 96.2 |
| 40% | ° C. | 109.0 |
| 50% | ° C. | 118.5 |
| 60% | ° C. | 127.0 |
| 70% | ° C. | |
| 80% | ° C. | 147.8 |
| 90% | ° C. | 161.5 |
| 95% | ° C. | 172.4 |
| FBP | ° C. | 199.4 |
| Paraffins | % v/v | 38.56* |
| Aromatics | % v/v | 49.34 |
| Oxygenates | % v/v | 0 |
| Sulphur (ASTM D2622-94) | mg/kg | 78 |

*Total volume of iso- and normal paraffins

Examples 1 to 4 and Comparative Examples A and B

The research octane number (RON) (ASTM D2699) and motor octane number (MON) (ASTM D2700) of fuels 1 to 4, A and B are given in Table 5 below.

TABLE 5

| RON and MON of fuel compositions | | | |
|---|---|---|---|
| Example | Fuel | RON | MON |
| 1 | 1 | 101 | 87.3 |
| 2 | 2 | 105.2 | 88.5 |
| 3 | 3 | 106.9 | 89.3 |
| 4 | 4 | 107.3 | 89.6 |
| A* | A | <40** | <40** |
| B* | B | 106*** | 89.5*** |

*Comparative Example
**Value was lower than the lower detection limit for the test method and apparatus (i.e. lower than 40)
***Average of two measurements It can be seen from Table 5 above that RON and MON values of the liquid fuel compositions according to the present invention are higher than would be expected from the weighted average of the individual components of the liquid fuels. In particular, it can surprisingly be seen that the RON value for the fuel in Example 3 is greater than the RON value measured for both the ethanol and the Fischer-Tropsch derived naphtha components used to prepare said fuel.

Examples 5 to 10 and Comparative Examples C to J

The Reid Vapour Pressure (RVP) (IP 394) for fuels 1 to 6 and A to H are given in Table 6 below.

TABLE 6

| Reid Vapour Pressure of fuel compositions | | |
|---|---|---|
| Example | Fuel | RVP (kPa) |
| 5 | 1 | 42.8 |
| 6 | 2 | 37.3 |
| 7 | 3 | 30.5 |
| 8 | 4 | 60.7 |
| 9 | 5 | 82.7 |
| 10 | 6 | 67.9 |
| C* | A | 59.0 |
| D* | B | 14.0 |
| E* | C | 84.3 |
| F* | D | 58.3 |
| G* | E | 40.0 |
| H* | F | 63.4 |
| I* | G | 46.9 |
| J* | H | 33.5 |

*Comparative Example

It can be seen from Table 6 above that the RVP of the liquid fuel composition comprising ethanol and the GTL naphtha only are lower than equivalent alcohol based fuels comprising ethanol and unleaded gasoline only (Example 7 compared to Comparative Examples G and J). However, it can be seen from Examples 8 to 10 that the RVP of the liquid fuel compositions according to the present invention can be advantageously controlled by the addition of butane to, for example, improve cold start performance.

We claim:

1. A liquid fuel composition suitable for use in an internal combustion engine consisting of:
   (a) from 50 to 90% v/v of a $C_1$-$C_4$ alcohol;
   (b) from 10 to 50% v/v of a Fischer-Tropsch derived naphtha having at least 90% v/v of paraffinic content and aromatics content of below 1% v/v;
   (c) from 0.1 to 10% v/v of a $C_3$-$C_6$ hydrocarbon component; and
   (d) one or more fuel additives.

2. The liquid fuel composition of claim 1 wherein the amount of $C_1$-$C_4$ alcohol is in the range of from 60 to 90% v/v.

3. The liquid fuel composition of claim 2 wherein the amount of $C_1$-$C_4$ alcohol is in the range of from 65 to 89% v/v.

4. The liquid fuel composition of claim 3 wherein the amount of $C_1$-$C_4$ alcohol is in the range of from 70 to 88% v/v.

5. The liquid fuel composition of claim 1 wherein the $C_1$-$C_4$ alcohol is ethanol.

6. The liquid fuel composition of claim 2 wherein the $C_1$-$C_4$ alcohol is ethanol.

7. The liquid fuel composition of claim 3 wherein the $C_1$-$C_4$ alcohol is ethanol.

8. The liquid fuel composition of claim 1 wherein the liquid composition additionally includes one or more fuel additive.

9. A method of operating an internal combustion engine comprising
   (a) introducing into a combustion chamber of said engine a liquid fuel composition of claim 1 and
   (b) operating said engine.

10. A method of operating an internal combustion engine comprising
    (a) introducing into a combustion chamber of said engine a liquid fuel composition of claim 2 and
    (b) operating said engine.

11. A method of operating an internal combustion engine comprising
   (a) introducing into a combustion chamber of said engine a liquid fuel composition of claim 3 and
   (b) operating said engine.

12. The liquid fuel composition of claim 1, wherein the Fischer-Tropsch derived naphtha has essentially no sulphur or nitrogen present.

* * * * *